(12) United States Patent
Annigeri et al.

(10) Patent No.: US 7,913,815 B2
(45) Date of Patent: Mar. 29, 2011

(54) AUTOMATED SEAL OIL BY-PASS SYSTEM FOR HYDROGEN COOLED GENERATORS

(75) Inventors: Ravindra Annigeri, Roswell, GA (US); Patrick William Anglin, Marietta, GA (US); Marlowe Cameron Bjorklund, Daphne, AL (US); Leigh-Ann Darden Heuser, Marietta, GA (US); Reginald Wayne Kemp, Atlanta, GA (US); David Lee Rogers, Marietta, GA (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 12/360,455

(22) Filed: Jan. 27, 2009

(65) Prior Publication Data

US 2010/0189545 A1 Jul. 29, 2010

(51) Int. Cl.
*F01D 25/18* (2006.01)
*F16J 15/40* (2006.01)
*F04D 29/08* (2006.01)
*F02C 7/06* (2006.01)

(52) U.S. Cl. .......... 184/6.11; 277/432; 137/601.14; 290/52; 415/175

(58) Field of Classification Search .......... 290/52; 310/52, 54, 55, 66; 415/175; 184/6.11; 277/432, 277/513; 137/182, 203–204, 599.11, 601.14; 60/39.08
See application file for complete search history.

(56) References Cited

U.S. PATENT DOCUMENTS

| | | | | |
|---|---|---|---|---|
| 3,390,525 A | * | 7/1968 | Spillmann | 376/310 |
| 3,448,916 A | * | 6/1969 | Fraser | 417/228 |
| 3,452,839 A | * | 7/1969 | Swearingen | 184/6 |
| 3,670,850 A | * | 6/1972 | Swearingen | 184/6.23 |
| 3,688,872 A | * | 9/1972 | Wagner | 184/6.28 |
| 3,831,381 A | * | 8/1974 | Swearingen | 60/657 |
| 4,005,580 A | * | 2/1977 | Swearingen | 60/657 |
| 4,058,320 A | | 11/1977 | Kosanovich | |
| 4,193,603 A | * | 3/1980 | Sood | 277/304 |
| 4,344,506 A | * | 8/1982 | Smith | 184/6.11 |
| 4,356,006 A | * | 10/1982 | Miller et al. | 95/19 |
| 4,446,377 A | * | 5/1984 | Kure-Jensen et al. | 290/52 |
| 4,452,037 A | * | 6/1984 | Waddington et al. | 60/39.08 |
| 4,792,911 A | | 12/1988 | Gonzalez et al. | |
| 4,883,995 A | * | 11/1989 | Rink, Jr. | 310/55 |
| 5,147,015 A | | 9/1992 | Snuttjer et al. | |
| 5,474,304 A | | 12/1995 | Daiber et al. | |
| 5,593,163 A | | 1/1997 | Daiber et al. | |
| 5,865,212 A | * | 2/1999 | Gaines | 137/599.11 |
| 6,086,333 A | * | 7/2000 | Krutzfeldt et al. | 417/54 |

* cited by examiner

*Primary Examiner* — Burton Mullins
(74) *Attorney, Agent, or Firm* — Hoffman Warnick LLC

(57) ABSTRACT

Disclosed is a solution to automate a seal oil float trap by-pass for a hydrogen cooled generator. An automated by-pass system is coupled to an existing manual by-pass system for a float trap for a hydrogen cooled generator. The automated by-pass system includes at least one solenoid valve and a controller that controls opening and closing of the solenoid valve. The automated by-pass system can also include manual valves, orifices and limit switches. The controller activates the solenoid valve to allow the seal oil to drain. The controller can also provide a notification alarm that the hydrogen cooled generator is being purged.

12 Claims, 3 Drawing Sheets

AUTOMATED SEAL OIL BY-PASS SYSTEM FOR HYDROGEN COOLED GENERATORS

BACKGROUND OF THE INVENTION

The present invention relates generally to hydrogen cooled generators and more particularly to an automated seal oil by-pass system for hydrogen cooled generators.

Hydrogen ($H_2$) gas provides an effective cooling medium in turbine generators because hydrogen's low density and high heat transfer coefficient provide an economical way to increase power density and maintain high efficiency. Conventionally, as shown in FIG. 1, a shaft sealing system 104 between stationary and rotating components isolates the $H_2$ gas in the generator casing 101. Within shaft sealing system 104, high-pressure seal oil enters a set of seal rings and passes radially between the seals and the shaft. The seal oil, at a pressure higher than generator casing 101 $H_2$ pressure, provides a safe and effective seal between the $H_2$ gas and the atmosphere.

Current seal oil systems employ a manual valve arrangement for operator-initiated by-pass of the seal oil in parallel with a float trap 107.

BRIEF DESCRIPTION OF THE INVENTION

A first aspect of the present invention provides a system comprising: a hydrogen cooled generator including: a rotor, a casing enclosing the rotor, and a seal assembly between the rotor and the casing, wherein the seal assembly includes seal oil; and a manual by-pass system, coupled to the generator, the manual by-pass system including: a set of piping, a drain opening in the set of piping configured to allow the seal oil to drain through the drain opening, a manual valve operatively connected in parallel with the set of piping controlling draining of the seal oil through the drain opening; and an automated by-pass system, coupled to the manual by-pass system, the automated by-pass system including: a solenoid valve operatively connected to the set of piping to allow the seal oil to by-pass the manual valve and drain through the drain opening; and a controller to control opening and closing of the solenoid valve.

A second aspect of the present invention provides a system comprising: a manual by-pass system, coupled to a hydrogen cooled generator, the manual by-pass system including: a set of piping, connected to the hydrogen cooled generator, configured to allow seal oil to drain from a seal oil assembly that is coupled to the hydrogen cooled generator; a drain opening in the set of piping configured to allow the seal oil to drain through the drain opening, and a manual valve operatively connected in parallel with the set of piping controlling draining of the seal oil through the drain opening; and an automated by-pass system, coupled to the manual by-pass system, the automated by-pass system including: a solenoid valve operatively connected to the set of piping to allow the seal oil to by-pass the manual valve and drain through the drain opening; and a controller to control opening and closing of the solenoid valve.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with hydrogen cooled generators. The solution described herein is a methodology to automate the seal oil float trap by-pass for eliminating oil ingress into the generators and to minimize operator intervention. The solution includes adding an automated by-pass system to an existing manual by-pass system. The automated by-pass system includes at least one solenoid valve, and a controller to activate the solenoid valve (s). The automated by-pass system can further include manual valves, orifices and limit switches. Use of automation can minimize operator intervention during the by-pass operation. For example, automation will eliminate the need for having an outside operator (in addition to the control room operator) who physically needs to open the manual valve. In addition, use of an automated seal oil float trap by-pass system can result in substantial reduction in generator down-time for gas turbine operators plus associated lost-revenue and costs associated with generator cleaning when the seal oil ingress occurs.

Figure 1:
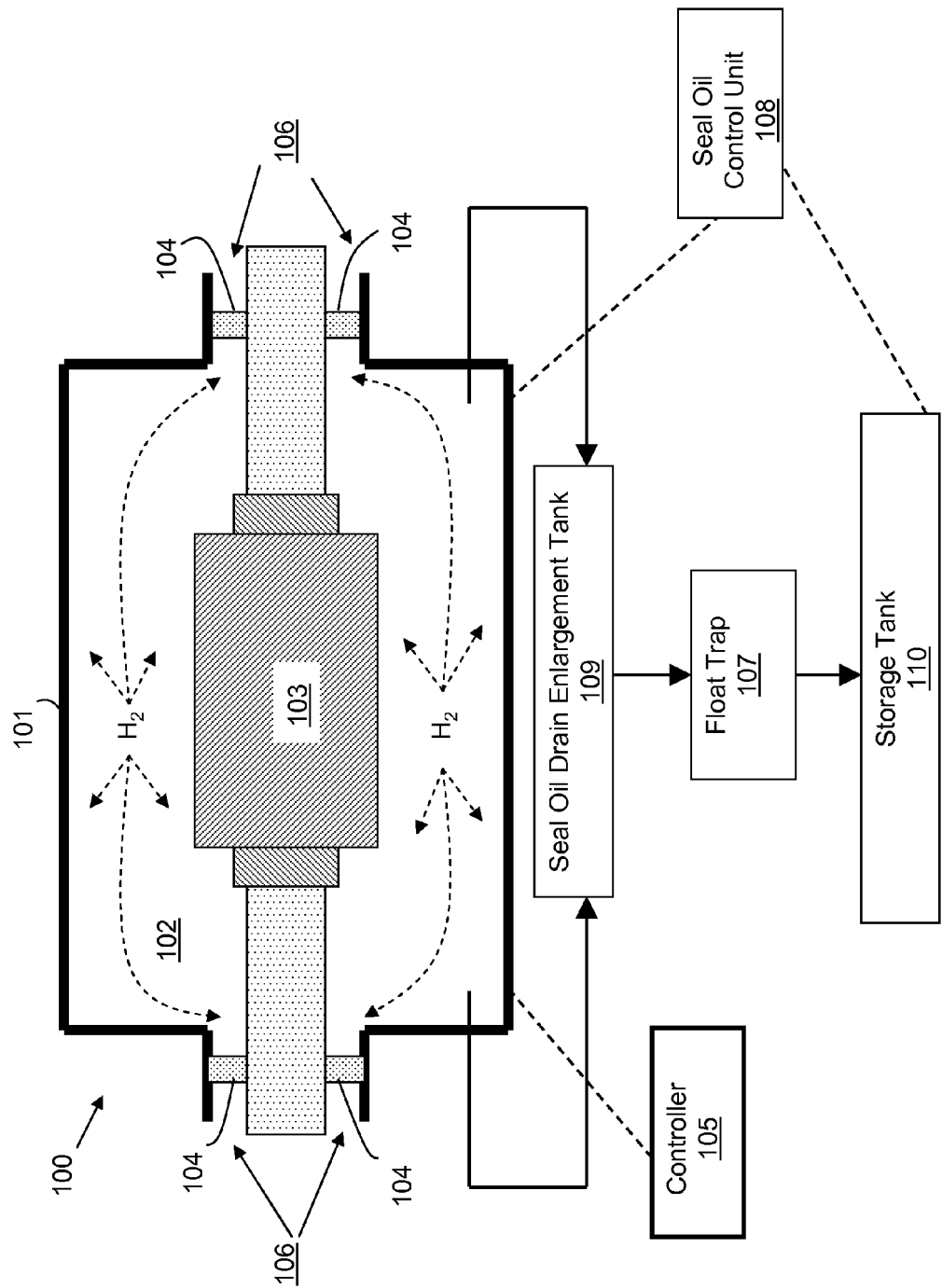
FIG. 1 is an illustrative schematic of a conventional seal oil float trap drain system for a hydrogen cooled generator.

Referring to the drawings, an illustrative schematic of a conventional seal oil float trap drain system for a hydrogen cooled generator 100 is shown in FIG. 1. A generator casing 101 is pressurized by the $H_2$ gas in a space 102 between generator casing 101 and a rotor 103. Such generators are typically purged with inert gas (such as carbon dioxide, $CO_2$) prior to the $H_2$ admission (e.g., during normal operation) or during the air admission (e.g., internal maintenance or during outages). Whether generator 100 is running in air or $H_2$, shaft seals, such as the seals in a hydrogen seal assembly 104, are used while generator 100 is running to separate a gas side 102 (the $H_2$ gas in space 102 within casing 101) and an air side 106 (the area outside seals 104). When running in air, the shaft sealing is necessary for supplying oil to seals 104 for preventing their heating-up and seizing of rotor 103. When running in the $H_2$, the shaft sealing is necessary in order to confine the $H_2$ in generator casing 101. Pressurized oil for seals 104 is supplied from an oil storage tank 110 to a seal oil control unit 108, as discussed in more detail below. A controller 105 may also be provided for controlling generator 100. Controller 105 may be a single, separate controller or combined with another generator control system.

As illustrated in FIG. 1, a float trap 107 may be used to prevent the loss of $H_2$ with the drain oil when operating at elevated $H_2$ pressures. Float trap 107 is separate from a seal oil control unit 108 and is mounted in close proximity to generator 100. It is desirable to avoid an undesirable hydrogen-air mixture when initially charging casing 101 with the $H_2$ or after removing the $H_2$ from casing 101 before opening it to the atmosphere. The seal oil flows on both bearing side 106 (i.e. the area outside the seals) and a generator side 102 (i.e. the area inside the generator casing 101). The oil flow from generator side (gas side) 102 enters a tank, such as seal oil drain enlargement tank 109. From seal oil drain enlargement tank 109, the seal oil drains to float trap 107 and from there, back to storage tank 110 for recirculation. The oil flow from bearing (air side) 106 flows through a separate detraining tank (not shown), which is vented to atmosphere and the oil is allowed to flow back to storage tank 110 for recirculation. Storage tank 110 may also supply the seal oil to hydrogen seal oil control unit 108. As illustrated in FIG. 1, the system is a closed-loop system, i.e., the seal oil is re-circulated and reused in the system.

As discussed herein, periodically, generator 100 needs to be purged, for example, during shut down or for maintenance. During this purge, the $H_2$ is removed, and the air is introduced. As shown in FIG. 1, float trap 107 lets the seal oil drain while maintaining the $H_2$ in casing 101. During a normal purge, generator gas pressure 102 is reduced to atmospheric pressure by venting. The motive drain force is a combination of pressure and gravity. As the pressure is reduced, there comes a point in time when the combined motive forces are no longer able to drain the float trap effectively enough to prevent flooding of the float trap. Currently, a manual by-pass system 200 (shown in FIG. 2) is provided with float trap 107 to allow the seal oil to by-pass float trap 107 and allow manual control of the oil level in a float trap sight glass. This manual action requires a site operator.

Figure 2:
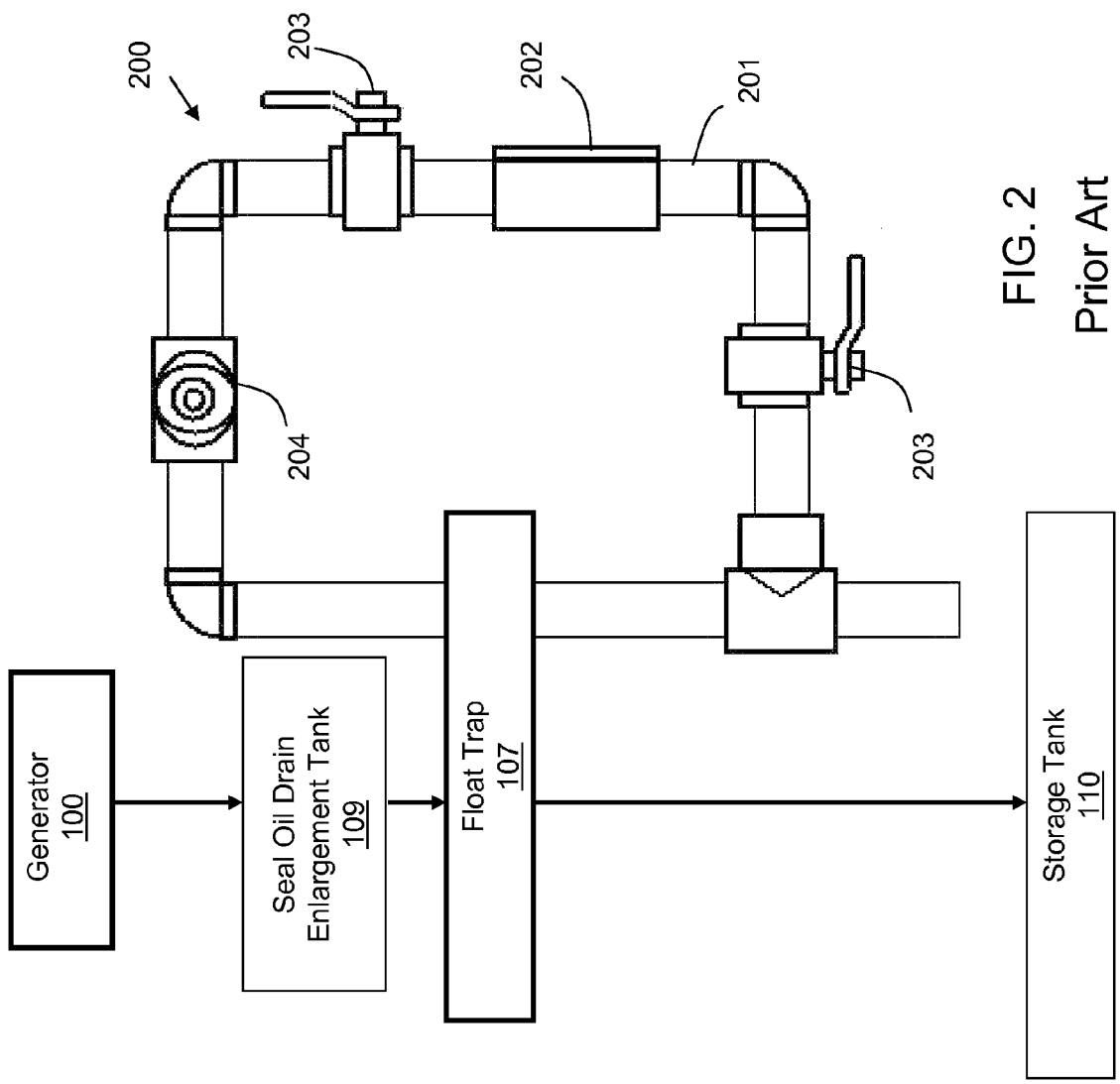
FIG. 2 is an example of a schematic of an existing manual by-pass arrangement for a seal oil float trap.

Manual by-pass system 200 shown in FIG. 2 is an illustrative by-pass arrangement for float trap 107 as currently known in the art. In this example, manual by-pass system 200 includes piping 201, level indicator 202, manual valves 203 and drain opening 204. In this manual system, valves 203 remain closed during normal operation. When the operator wishes to manually control the system, the operator opens manual valves 203, allowing the oil to flow through piping 201 to drain opening 204. Level indicator 202 indicates to the operator the oil level in piping 201. When the oil level indicated by device 202 reaches the normal level, the operator can manually throttle manual valves 203 to maintain the desired level. With this manual system, there is no warning or indication to the operator that the system needs to be drained. In addition, an operator must be present to manually operate the system.

Figure 3:
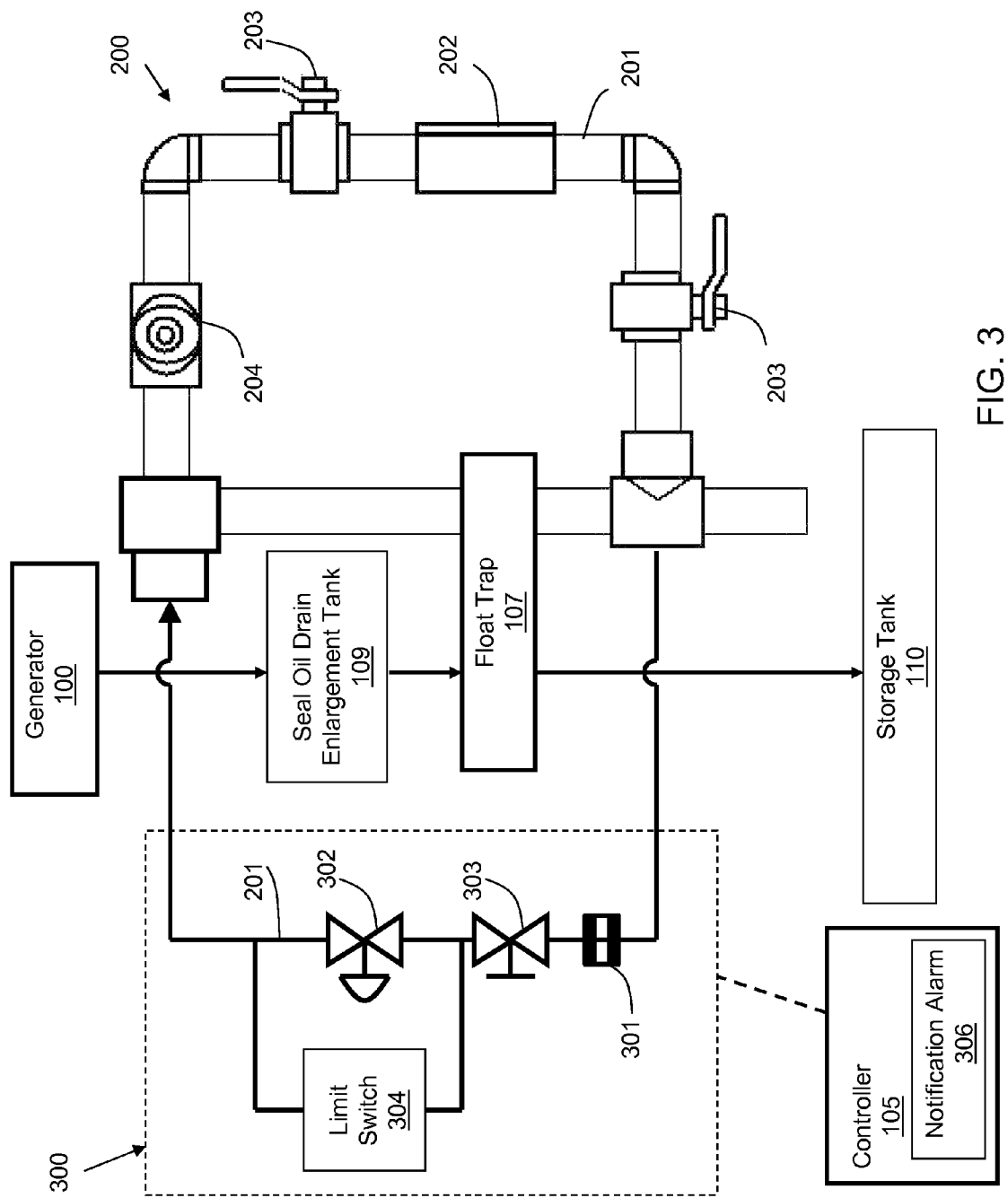
FIG. 3 is a schematic of an automated seal oil by-pass system added on to the existing manual by-pass arrangement according to embodiments of the invention.

As shown in FIG. 3, an automated by-pass arrangement 300 according to embodiments of this disclosure involves several modifications to existing manual by-pass arrangement 200 of FIG. 2. These modifications are discussed in more detail below and are illustrated in FIG. 3 (showing existing manual by-pass system 200 and automated by-pass add-on system 300).

Depending on the configuration of float trap piping arrangements currently in use, the piping arrangement can be modified as desired in order to connect automated by-pass system 300 to existing manual by-pass system 200. Shown in FIG. 3, one way of modifying the existing arrangement is to remove a part of existing piping 201 and to add a new connection, such as T-connection 305, or a similar interconnecting piping connection. Solenoid valve 302 can then be added to piping 201, e.g., by additional piping. Additional hardware, such as orifice 301, manual valve 303, limit switch 304, etc., can also be installed, as desired. While only one solenoid valve 302 is shown in FIG. 3, additional solenoid valves 302 can be included. Such additional solenoid valves 302 can operate, for example, to allow oil to flow through piping 201 in the same manner as single solenoid valve 302 discussed herein. Solenoid valve 302 can be activated by any known means, e.g., electrically, hydraulically and/or pneumatically. During normal operation of generator 100, solenoid valve 302 remains closed. When desired, e.g., when generator 100 is purged, or when the oil level in float trap 107 exceeds a preset limit, solenoid valve 302 is opened, and the oil is allowed to flow through orifice 301. Orifice 301 controls the flow of oil through piping 201 by altering the size of the opening through which the oil flows. Again, while one orifice 301 is shown in FIG. 3, additional orifices 301 can be used as desired. The oil continues to flow through piping 201, through manual stop valve 303, into existing manual by-pass system 200, and out through drain opening 204. Limit switch 304 provides feedback to controller 105 to indicate the position of solenoid valve 302, e.g., whether solenoid valve 302 is open or closed. While controller 105 is shown as separate from controls for generator 100, other configurations as understood in the art can be utilized. For example, controller 105 may be interpreted as part of the controls for generator 100.

Existing generator controller software can be modified, or new controller software can be added to controller 105 for automated by-pass system 300, to activate solenoid valve 302 for initiating automated by-pass system 300 as needed, for example, during generator purging. As these software modifications are well within the purview of one with ordinary skill in the art, no further explanation of how the controller software is modified will be provided.

In addition, a new notification alarm 306 may be added to the control software, to notify the operator that generator 100 is being purged. Again, as noted above, these modifications can be made to an existing controller software, or automated by-pass system 300 can access its own, separate, controller. This automated notification alarm can alert the control room operator to request assistance from the outside operator to visually inspect seal oil float trap 107 to ensure a proper operation of solenoid valve 302. If solenoid valve 302 does not operate as desired, then the outside operator can be asked to open manual by-pass valve 303. Notification 306 can also alert the control room operator to notify the outside operator to ensure that manual by-pass valve 303 is restored to the closed or normal operating position.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A system comprising:
   a hydrogen cooled generator including:
      a rotor,
      a casing enclosing the rotor, and
      a seal assembly between the rotor and the casing, wherein the seal assembly includes seal oil;
   a manual by-pass system, coupled to the generator, the manual by-pass system including:
      a set of piping, a drain opening in the set of piping configured to allow the seal oil to drain through the drain opening, a manual valve operatively connected in parallel with the set of piping controlling draining of the seal oil through the drain opening;

an automated by-pass system, coupled to the manual by-pass system, the automated by-pass system including:

a solenoid valve operatively connected to the set of piping to allow the seal oil to by-pass the manual valve and drain through the drain opening; and a controller to control opening and closing of the solenoid valve.

2. The system of claim 1, the controller further including a notification alarm that the hydrogen cooled generator is being purged.

3. The system of claim 1, wherein the automated by-pass system further includes a limit switch coupled to the solenoid valve, the limit switch configured to provide feedback to the controller regarding the solenoid valve.

4. The system of claim 1, wherein the automated by-pass system further includes at least one orifice in the set of piping configured to control a flow of the seal oil through the set of piping.

5. The system of claim 1, wherein the solenoid valve is activated by at least one of the following means: electrical, hydraulic or pneumatic.

6. The system of claim 1, wherein the automated by-pass system includes a manual valve operatively connected in parallel with the set of piping for controlling draining of the seal oil through the drain opening.

7. A system comprising:

a manual by-pass system, coupled to a hydrogen cooled generator, the manual by-pass system including:

a set of piping, connected to the hydrogen cooled generator, configured to allow seal oil to drain from a seal oil assembly that is coupled to the hydrogen cooled generator;

a drain opening in the set of piping configured to allow the seal oil to drain through the drain opening, and a manual valve operatively connected in parallel with the set of piping controlling draining of the seal oil through the drain opening;

an automated by-pass system, coupled to the manual by-pass system, the automated by-pass system including:

a solenoid valve operatively connected to the set of piping to allow the seal oil to by-pass the manual valve and drain through the drain opening; and a controller to control opening and closing of the solenoid valve.

8. The system of claim 7, wherein the controller further includes a notification alarm that the hydrogen cooled generator is being purged.

9. The system of claim 7, wherein the automated by-pass system further includes a limit switch coupled to the solenoid valve, the limit switch configured to provide feedback to the controller regarding the solenoid valve.

10. The system of claim 7, wherein the automated by-pass system further includes at least one orifice in the set of piping configured to control a flow of the seal oil through the set of piping.

11. The system of claim 7, wherein the solenoid valve is activated by at least one of the following means: electrical, hydraulic or pneumatic.

12. The system of claim 7, wherein the automated by-pass system includes a manual valve operatively connected in parallel with the set of piping controlling draining of the seal oil through the drain opening.

* * * * *